(12) United States Patent
McGee (10) Patent No.: US 11,871,734 B2
(45) Date of Patent: Jan. 16, 2024

(54) NET RETENTION (71) Applicant: Ben Nevis McGee, Erie, CO (US)

(72) Inventor: Ben Nevis McGee, Erie, CO (US)

( * ) Notice: Subject to any disclaimer, the term of this patent is extended or adjusted under 35 U.S.C. 154(b) by 0 days.

(21) Appl. No.: 18/050,136

(22) Filed: Oct. 27, 2022

(65) Prior Publication Data

US 2023/0397586 A1 Dec. 14, 2023

Related U.S. Application Data

(62) Division of application No. 17/836,195, filed on Jun. 9, 2022, now Pat. No. 11,690,363.

(51) Int. Cl.
| | |
|---|---|
| *A01K 77/00* | (2006.01) |
| *A01K 75/00* | (2006.01) |
| *A45F 5/02* | (2006.01) |
| *A45F 5/00* | (2006.01) |

(52) U.S. Cl.
CPC .............. *A01K 77/00* (2013.01); *A01K 75/00* (2013.01); *A45F 5/02* (2013.01); *A45F 5/00* (2013.01)

(58) Field of Classification Search
CPC .... A01K 77/00; A01K 75/00; B65D 2313/04; A47G 1/17; A45F 5/02; A45F 5/00
USPC ............. 43/7, 11, 12; 24/303; 206/350, 818; 248/683, 537, 467, 206.5, 309.4; 446/92, 446/129, 131–133, 135, 136; 40/600, 40/621; 224/183
See application file for complete search history.

(56) References Cited

U.S. PATENT DOCUMENTS

| | | | |
|---|---|---|---|
| 440,568 A * | 11/1890 | Hebard | A01K 77/00 43/12 |
| 546,023 A * | 9/1895 | Meisselbach et al. | A01K 77/00 43/12 |
| 941,961 A * | 11/1909 | Spiegle | A01K 77/00 43/12 |

(Continued)

FOREIGN PATENT DOCUMENTS

| | | | |
|---|---|---|---|
| CH | 227531 A * | 6/1943 | |
| DE | 29610253 U1 * | 8/1996 | A01K 77/00 |

(Continued)

OTHER PUBLICATIONS

Ark, Darren W., First Action on the Merits for U.S. Appl. No. 17/836,195, dated Nov. 7, 2021, 92 pages.

(Continued)

*Primary Examiner* — Darren W Ark (74) *Attorney, Agent, or Firm* — MP Patents, LLC (57) ABSTRACT

A net retaining system includes a base component and a head component. The base component includes a first surface, an opposite second surface, a retention member provided to the first surface and a cradle projecting from the first surface and configured to grip a net rim near a net handle. The head component includes, a first engagement member facing a first direction, a second engagement member facing a second, opposite direction and a column having first and second ends. The first and second engagement members are configured for selective coupling with the retention member of the base component. The column separates the first and second engagement members and is configured to extend through the net handle so as to resist rotation relative to the net handle.

11 Claims, 10 Drawing Sheets

(56) References Cited

U.S. PATENT DOCUMENTS

| | | | | |
|---|---|---|---|---|
| 1,024,653 | A * | 4/1912 | Sargent | A01K 77/00 224/247 |
| 1,894,192 | A * | 1/1933 | Olson | A01K 77/00 43/12 |
| 2,172,175 | A * | 9/1939 | Probst | A01K 77/00 224/621 |
| 2,212,756 | A * | 8/1940 | Stewart | A01K 77/00 24/3.9 |
| 2,297,806 | A * | 10/1942 | Smith | B43K 23/002 211/DIG. 1 |
| 2,414,653 | A * | 1/1947 | Lookholder | A47K 1/09 211/DIG. 1 |
| 2,434,973 | A * | 1/1948 | Williams | B43L 19/0062 211/DIG. 1 |
| 2,455,765 | A * | 12/1948 | Harvey | A01K 77/00 24/3.12 |
| 2,469,978 | A * | 5/1949 | Mrozinski | A01K 97/14 242/379.2 |
| 2,578,237 | A * | 12/1951 | Geistweit | A01K 77/00 224/678 |
| 2,637,133 | A * | 5/1953 | Ross | A01K 77/00 43/12 |
| 2,642,999 | A * | 6/1953 | McPherson | H01F 7/0252 D6/531 |
| 2,798,241 | A * | 7/1957 | Cohen | A46B 15/0095 15/105 |
| 2,841,847 | A * | 7/1958 | Wallace | A01K 77/00 24/3.1 |
| 3,148,856 | A * | 9/1964 | Orlando | G09F 17/00 248/205.6 |
| 3,245,165 | A * | 4/1966 | Podoloff | F16B 5/0258 248/467 |
| 3,782,799 | A * | 1/1974 | Hansen | A47K 1/09 211/DIG. 1 |
| 3,965,613 | A * | 6/1976 | Saunders | A63H 17/26 446/132 |
| 4,571,875 | A * | 2/1986 | Ballas | A01K 77/00 43/11 |
| 4,723,695 | A * | 2/1988 | Farber | A01K 77/00 224/272 |
| 4,980,988 | A * | 1/1991 | Whitman | A01K 77/00 224/920 |
| 5,163,566 | A * | 11/1992 | Hempel | A47K 1/09 211/DIG. 1 |
| 5,213,240 | A * | 5/1993 | Dietz | G01B 3/1071 224/678 |
| 5,432,986 | A * | 7/1995 | Sexton | A44C 5/2071 24/303 |
| 5,456,037 | A * | 10/1995 | Dorval | A01K 77/00 24/3.2 |
| 5,620,089 | A * | 4/1997 | Mills | A47G 29/10 206/37.8 |
| 5,651,141 | A * | 7/1997 | Schneider | A01K 77/00 224/103 |
| 5,913,707 | A * | 6/1999 | Roman | A63H 33/26 446/131 |
| 5,996,267 | A * | 12/1999 | Breckenridge | A01K 77/00 43/11 |
| 6,036,067 | A * | 3/2000 | Alcorn | A01K 77/00 206/315.11 |
| 6,729,591 | B2 * | 5/2004 | Hsu | G09F 7/04 248/205.6 |
| 6,895,642 | B2 * | 5/2005 | Huang | F16M 13/022 248/205.5 |
| 7,066,361 | B1 * | 6/2006 | Williams | A45F 5/02 224/608 |
| 7,322,146 | B1 * | 1/2008 | Baldwin | A01K 77/00 24/303 |
| 7,331,133 | B2 * | 2/2008 | Bauernfeind | B62D 41/00 40/661.01 |
| 7,360,334 | B2 * | 4/2008 | Christiansen | A01K 77/00 224/183 |
| 7,651,419 | B2 * | 1/2010 | Brunner | A63B 49/08 473/549 |
| 7,817,002 | B2 * | 10/2010 | Fullerton | A45F 5/02 2/322 |
| 7,821,367 | B2 * | 10/2010 | Fullerton | A45F 3/14 2/102 |
| 8,490,936 | B2 * | 7/2013 | Rinck | F21V 17/105 362/396 |
| 8,499,990 | B2 * | 8/2013 | Smith | A45F 5/02 224/676 |
| 8,505,420 | B2 * | 8/2013 | Alfaro | B25G 1/10 81/489 |
| 8,973,881 | B2 * | 3/2015 | Mihajlovic | G09F 7/04 211/49.1 |
| 9,140,279 | B2 * | 9/2015 | Frias | F16B 5/0208 |
| 9,204,710 | B1 * | 12/2015 | Burns | F16M 11/22 |
| 9,333,641 | B2 * | 5/2016 | Macias | B25H 3/00 |
| 11,272,275 | B1 * | 3/2022 | Michno | F16B 43/00 |
| 11,459,162 | B2 * | 10/2022 | Adjeleian | B65D 23/003 |
| 11,690,363 | B1 * | 7/2023 | McGee | A01K 77/00 43/7 |
| 2004/0000085 | A1 * | 1/2004 | Grill | A01K 77/00 43/11 |
| 2004/0088824 | A1 * | 5/2004 | Hsien | B25G 1/00 16/111.1 |
| 2005/0218285 | A1 * | 10/2005 | Yorns | B25H 3/006 248/314 |
| 2007/0214702 | A1 * | 9/2007 | Christiansen | A01K 77/00 43/11 |
| 2008/0014043 | A1 * | 1/2008 | Zasloff | F16B 13/126 248/220.31 |
| 2009/0289089 | A1 * | 11/2009 | Fullerton | H01F 7/0215 224/183 |
| 2010/0116955 | A1 * | 5/2010 | Hayes | B29C 39/26 248/206.5 |
| 2012/0280098 | A1 * | 11/2012 | Rinck | F21V 17/105 248/304 |
| 2012/0305611 | A1 * | 12/2012 | Blood | A45B 1/00 29/525.08 |
| 2013/0019380 | A1 * | 1/2013 | Sitt | A42B 1/24 248/205.2 |
| 2014/0259552 | A1 * | 9/2014 | Macias | B25H 3/00 24/303 |
| 2015/0060378 | A1 * | 3/2015 | Bestor | B60R 9/04 248/205.5 |
| 2015/0069100 | A1 * | 3/2015 | Blood | A45F 5/021 224/269 |
| 2016/0016306 | A1 * | 1/2016 | Haddon | B25H 3/04 248/537 |
| 2016/0101372 | A1 * | 4/2016 | Antolin | A63H 33/26 446/132 |
| 2016/0286294 | A1 * | 9/2016 | Schreiber | F16M 13/02 |
| 2017/0276159 | A1 * | 9/2017 | Robinson | A47B 13/021 |
| 2018/0137789 | A1 * | 5/2018 | Murray, III | H01F 7/0257 |
| 2020/0296943 | A1 * | 9/2020 | Mast | A01K 77/00 |
| 2021/0020344 | A1 * | 1/2021 | Vazquez | A44B 99/00 |
| 2021/0059231 | A1 * | 3/2021 | Hogan | A01K 77/00 |
| 2021/0156514 | A1 * | 5/2021 | Stewart | F16M 11/2078 |
| 2022/0201995 | A1 * | 6/2022 | Slusher | A01K 75/00 |
| 2022/0201996 | A1 * | 6/2022 | Slusher | A01K 77/00 |
| 2022/0315367 | A1 * | 10/2022 | Nelson | B65D 67/085 |
| 2023/0029950 | A1 * | 2/2023 | Bishop | A01K 77/00 |
| 2023/0082933 | A1 * | 3/2023 | Chilukuri | A47G 29/087 211/86.01 |

FOREIGN PATENT DOCUMENTS

| | | | | |
|---|---|---|---|---|
| GB | | 2322279 A * | 8/1998 | A01K 77/00 |
| JP | | 2013208069 A * | 10/2013 | |

(56) References Cited

FOREIGN PATENT DOCUMENTS

JP            2015000061 A    *   1/2015
JP            2018161077 A    *   10/2018

OTHER PUBLICATIONS

Fish On! Website, https://www.anglingtrade.com/2022/04/05/fishnetmagnet-introduces-the-no-brainer-net-retainer/, Apr. 5, 2022, retrieved Jun. 9, 2022, U.S.

Matt Clarke, Greys GS Scoop Net Review, Fly and Lure, http://flyandlure.org/articles/fly_fishing_gear_reviews/greys_gs_scoop_net_review, downloaded Jun. 21, 2022.

Tactical Fly Fisher Rubber Mesh Net advertisement, Tactical Fly Fisher, https://www.tacticalflyfisher.com/tactical-fly-fisher-rubber-mesh-net/, downloaded Jun. 21, 2022.

* cited by examiner

NET RETENTION

TECHNICAL FIELD

The disclosure pertains to detachable securement of tools or accessories to their users.

SUMMARY

The disclosure describes a net retention system. The net retention system includes a base component and a head component. The base component includes a first surface, an opposite second surface, a retention member provided to the first surface and a cradle projecting from the first surface and configured to grip a net rim near a net handle. The head component includes, a first engagement member facing a first direction, a second engagement member facing a second, opposite direction and a column having first and second ends. The first and second engagement members are configured for selective coupling with the retention member of the base component. The column separates the first and second engagement members and is configured to extend through the net handle so as to resist rotation relative to the net handle.

BRIEF DESCRIPTION OF THE FIGURES

The summary above, as well as the following detailed description of illustrative embodiments, is better understood when read in conjunction with the appended figures. For the purpose of illustrating the disclosure, example constructions are shown in the figures. However, the disclosure is not limited to specific methods and instrumentalities disclosed herein. Moreover, those having ordinary skill in the art will understand that the figures are not to scale. Wherever possible, like elements have been indicated by identical numbers.

Embodiments of the disclosure will now be described, by way of example only, with reference to the following diagrams wherein.

DETAILED DESCRIPTION

The following detailed description illustrates embodiments of the disclosure and manners by which they can be implemented. Although the best mode of carrying out disclosed handles, systems and methods has been described, those of ordinary skill in the art would recognize that other embodiments for carrying out or practicing disclosed handles, systems and methods are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Known means of attaching a tool to a personal article such as clothing or a backpack undesirably allow the tool to sheer, pull off, rotate away from the personal article. Such means undesirably allow fishing/angling nets to disengage from personal articles as a reaction to environmental conditions such as a wind, gravity and vegetation snags.

Embodiments of the disclosure substantially eliminate, or at least partially address, problems in the prior art, enabling a user to retain and physically support a net or tool against undesired disengagement while allowing the user to disengage the net or tool in a preferred direction.

Additional aspects, advantages, features and objects of the disclosure will be made apparent from the figures and the detailed description of the illustrative embodiments construed in conjunction with the appended claims that follow.

It will be appreciated that described features are susceptible to being combined in various combinations without departing from the scope of the disclosure as defined by the appended claims.

The disclosure describes a net retention system or a net-retaining system. The net retaining system includes a dock or base component 200 and a head component 100 configured for selective coupling or docking with or anchoring to the base component 200.

Figure 1:
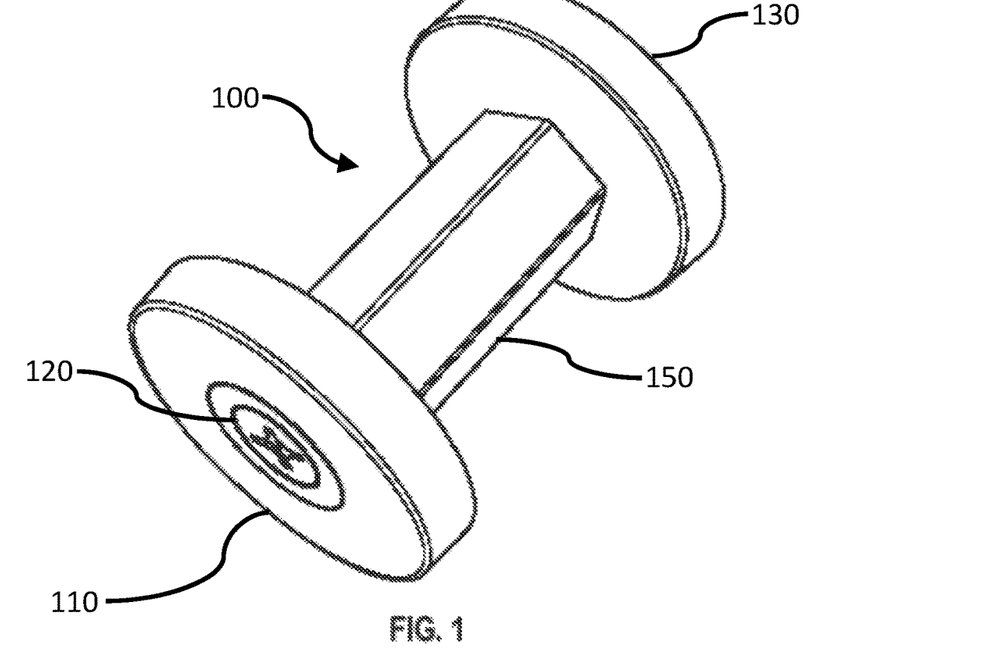
FIG. 1 illustrates a perspective view of an example head component in accordance with the disclosure.
Figure 2:
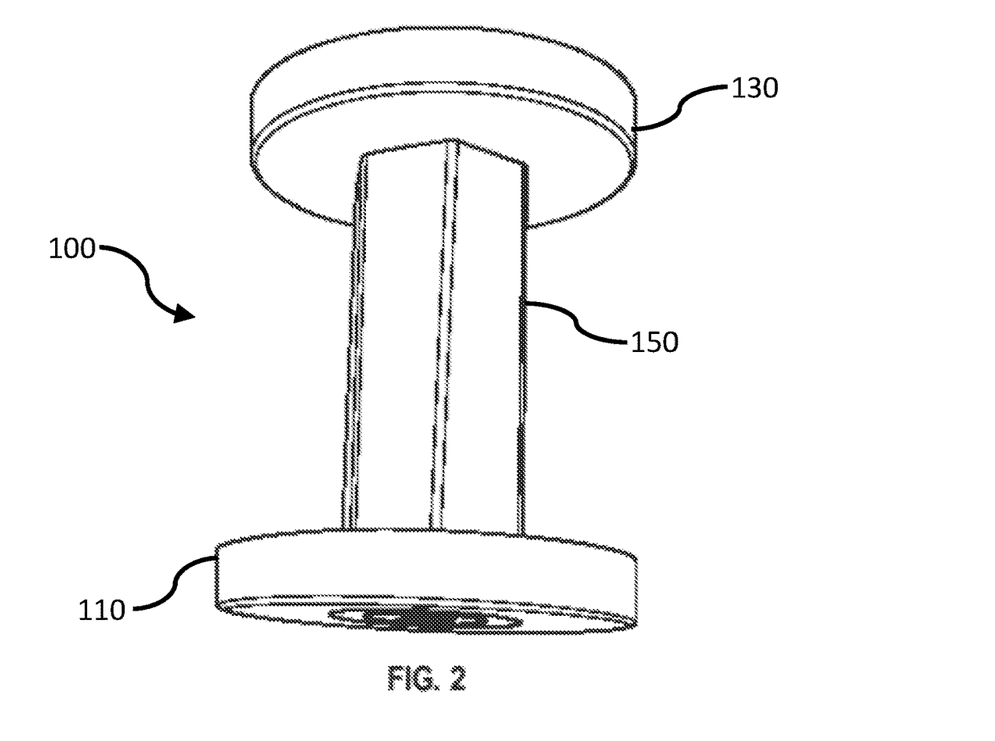
FIG. 2 illustrates a side view of the example head component of FIG. 1.
Figures 3, 4:
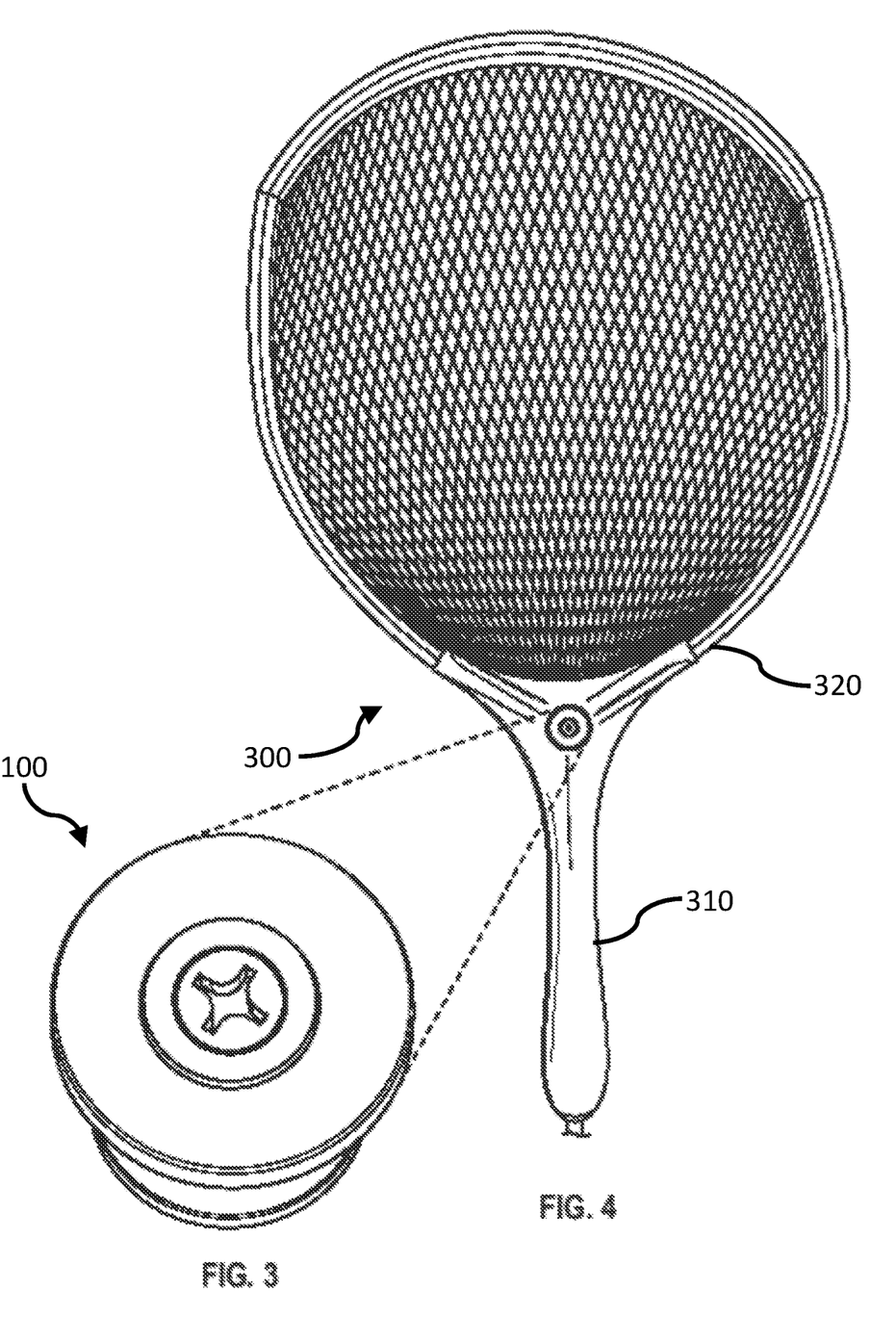
FIG. 3 illustrates a side view of the example head component of FIGS. 1 & 2.
FIG. 4 illustrates an example head component in association with a net handle.
Figure 5:
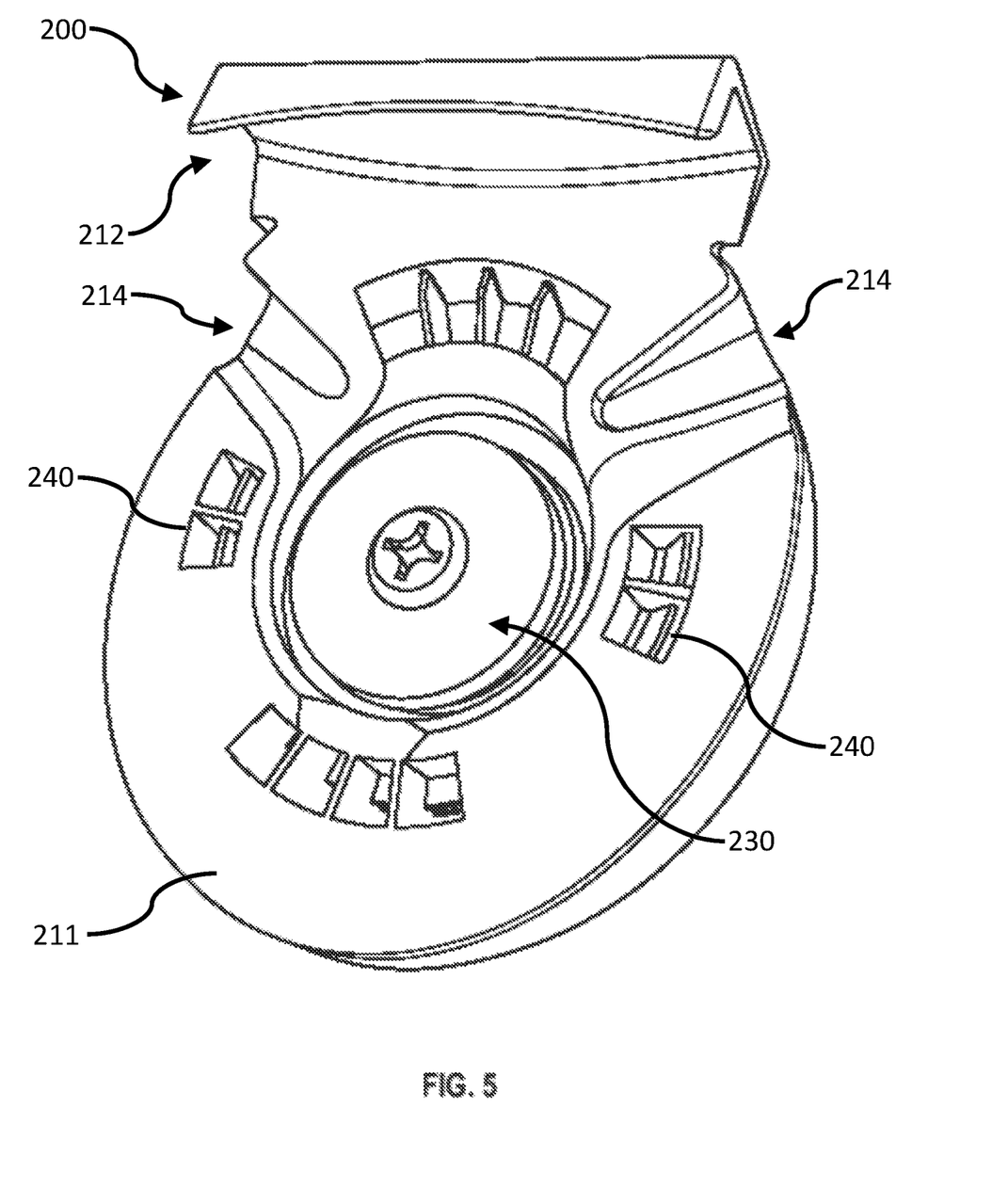
FIG. 5 illustrates a front perspective view of an example base component in accordance with the disclosure.
Figure 6:
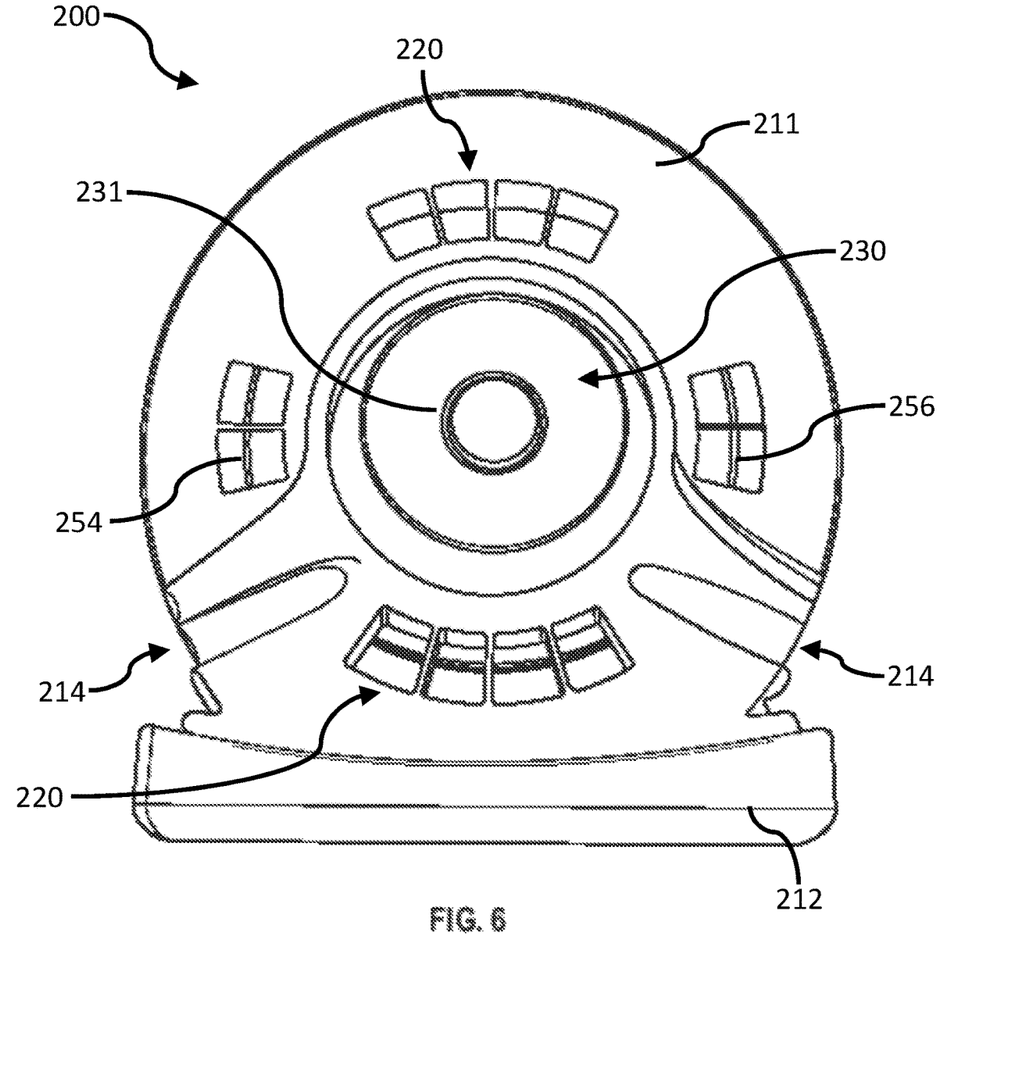
FIG. 6 illustrates a front view of the example base component of FIG. 5.
Figure 7:
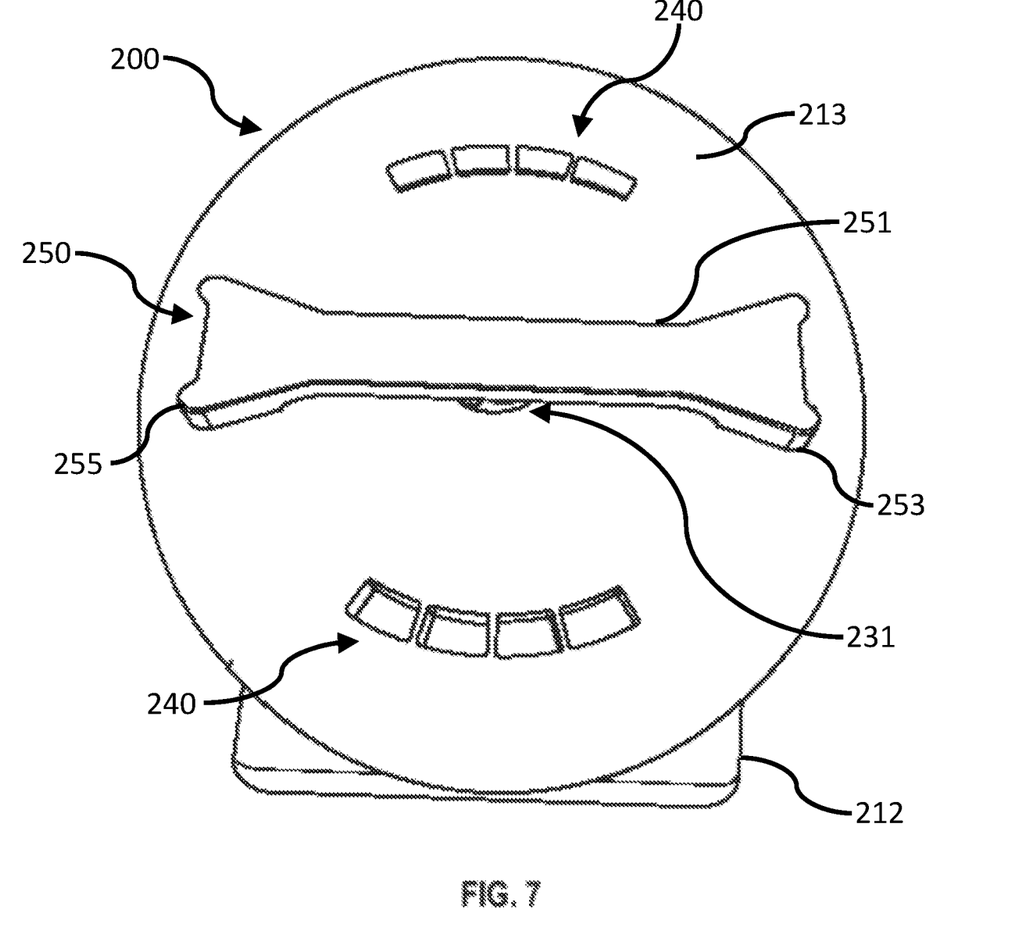
FIG. 7 illustrates a rear view of the example base component of FIGS. 5 & 6.
Figure 8:
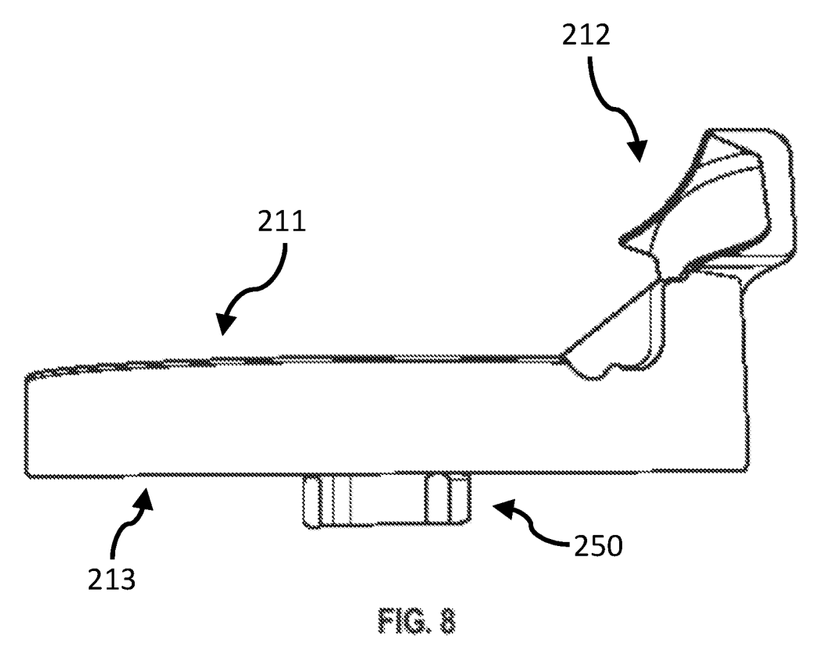
FIG. 8 illustrates a side view of the example base component of FIGS. 5-7.
Figure 9:
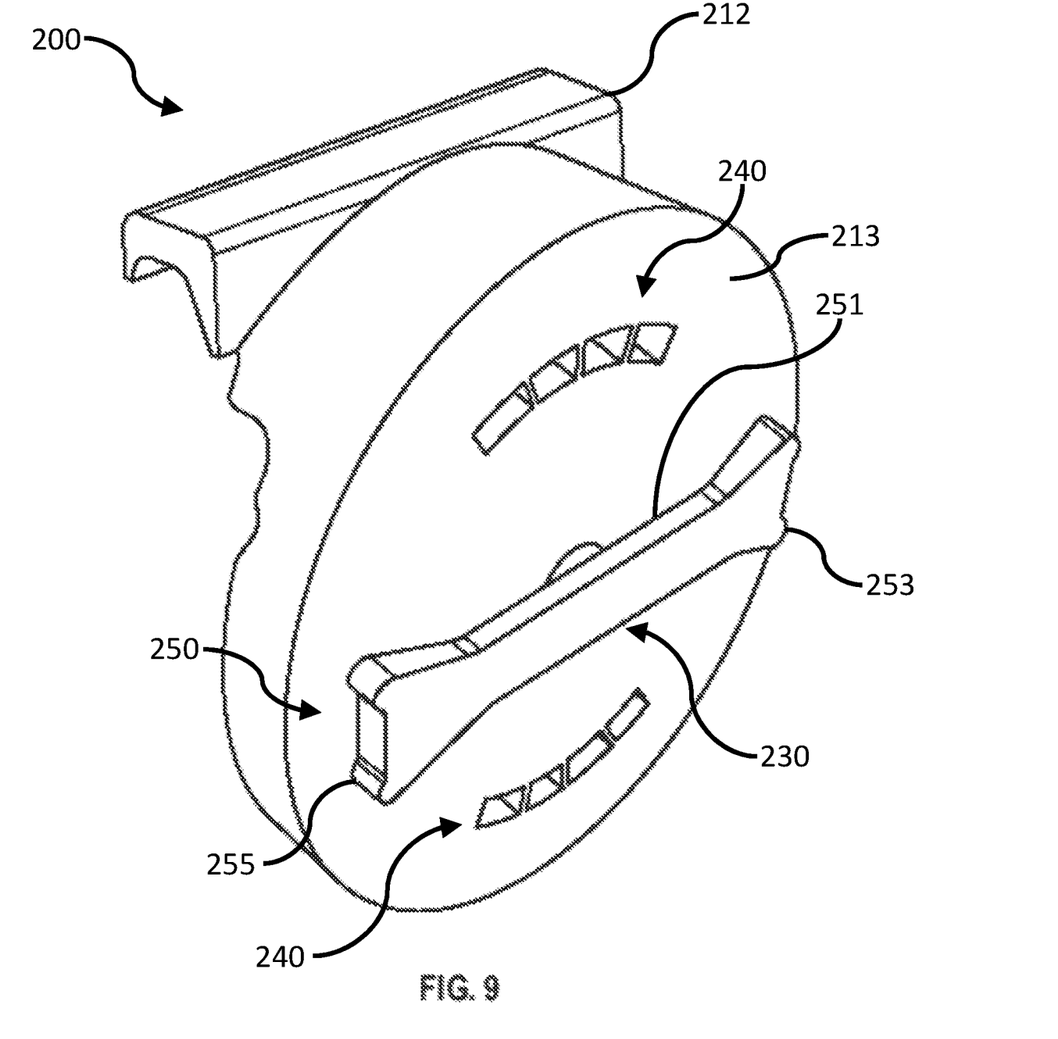
FIG. 9 illustrates a rear perspective view of the example base component of FIGS. 5-8.

FIGS. 1-3 illustrate an example head or anchor component 100 in accordance with the disclosure. The head component 100, which could be considered a shuttle, satellite or peripheral component includes a first engagement member 110 facing a first direction, a second engagement member 130 facing a second, opposite direction and a column 150 having first and second ends.

The first and second engagement members 110 and 130 are configured for selective coupling with a retention member of a base component. In an example, the first and second engagement members 110 and 130 include magnets. In a further example, the magnets take the form of thin annular disks. In a still further example, the magnets include neodymium magnets. Central planes of the first and second engagement members 110 and 130 may be approximately parallel. With the central planes of the first and second magnets approximately parallel, their magnetic poles are directed outward and away from one another such that they experience mutual repulsive forces. Being approximately parallel, the central planes may appear to be parallel to an ordinary observer. For example, the central planes may vary from parallel by 5 degrees.

Figure 12:
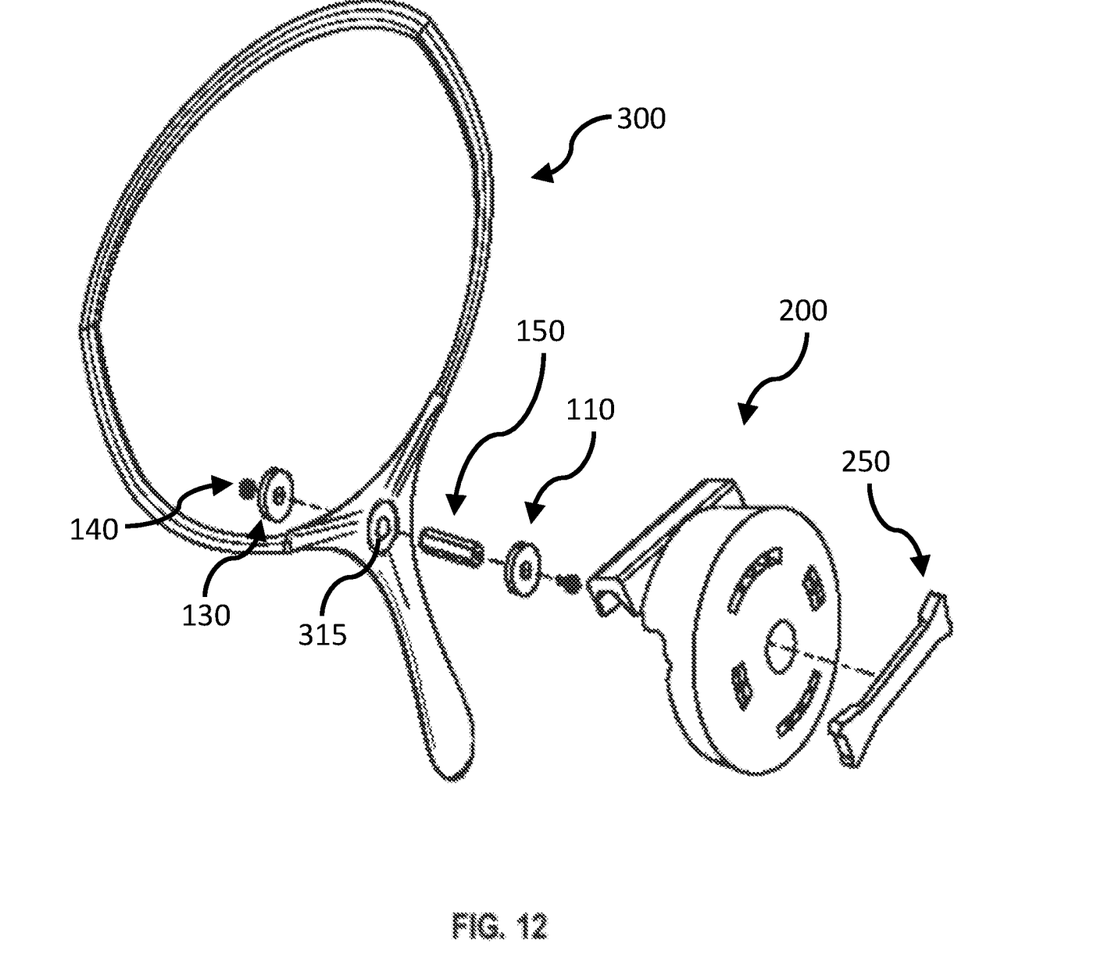
FIG. 12 illustrates an exploded view of an example net retention system in association with a net.

The column 150 separates the first and second engagement members 110 and 130 by the distance between its first and second ends and is configured to extend through a handle so as to resist rotation relative to the handle about the central longitudinal axis of the column 150. In an example, the column 150 includes external facets and/or elongate, circumferential edges to, in cooperation with internal surfaces of a hole 315 through the handle, resist rotation (FIG. 12). In a further example, the column 150 takes the form of a hexagonal prism and the hole has a hexagonal crosssection. In a still further example, the hexagonal prism takes the form of a right, regular hexagonal prism.

A first fastener 120 couples the first engagement member 110 against the column first end through a central hole and a second fastener 140 couples the second engagement member 130 against the column second end through a central hole. In an example, the column 150 includes an internally threaded lumen and each of the first and second fasteners include external threads configured to cooperate with the internal threads of the column 150. To reduce the profile of the fasteners and thereby reduce obstruction between the engagement members 110 and 130 and a retention member of a base component, the first and second engagement members 100 and 130 may each further include countersunk through-holes.

The first and second engagement members 110 and 130 may take any of a variety of dimensions providing sufficient attachment surface area for interaction with a base component retention member. In an example, the first and second engagement members 110 and 130 are about 0.5 inches in diameter or across and are about 0.13 inches thick. In an example, an internal diameter of the first and second engagement members 110 and 130 is about 0.25 inches.

The column 150 may take any of a variety of lengths suitable for substantially spanning the thickness of a handle. In an example, the column 150 is about 1.0 inches long. Similarly, the column 150 may take any of a variety of dimensions across provided the dimension is suitable for embedding in a handle. In an example, the column 150 is about 0.25 inches in diameter or across.

Any of a variety of methods for producing a docking handle may employ a head component. According to one example method, a first engagement member is provided to one side of an external surface of a handle facing a first direction and a second engagement member is provided to a second, opposite side of the external surface facing a second direction opposite the first direction. As magnets, the first and second engagement members may be arranged such that their magnetic poles are directed outward from the first and second sides of the grip, respectively.

Providing the first and second engagement members may include inserting a column through an opening in a handle, handle grip and/or handle shaft such that first and second ends of the column are adjacent to opposite, exterior surfaces of the grip and coupling the first and second engagement members with the column. The column inserted may be configured to resist rotation relative to the grip, for example, with external facets. The opening in the grip may have interior walls with shape complementary to that of the external facets of the column so that relative rotation is resisted. The column inserted may resemble a hexagonal prism.

To couple a first engagement member with the first end of the column with a first fastener, the first fastener is inserted through a central opening of the first engagement member and into engagement with an internal lumen of the column from the column first end. The first fastener may be advanced along the internal lumen until a head of the first fastener retains the first engagement member against the column first end so that the first engagement member is flush or generally continuous with an exterior surface of the grip and the first fastener is counter sunk and flush with the first engagement member. In cases where the first fastener and the internal lumen of the column are provided with cooperating threads, the first fastener is rotated to advance into the internal lumen until the first engagement member is tightly coupled with the column.

To couple a second engagement member with the second end of the column with a second fastener, the second fastener is inserted through a central opening of the second engagement member and into engagement with the internal lumen of the column from the column second end. The second fastener may be advanced along the internal lumen until a head of the second fastener retains the second engagement member against the column second end so that the second engagement member is flush or generally continuous with the external surface of the grip and the second fastener is counter sunk and flush with the second engagement member. In cases where the second fastener and the internal lumen of the column are provided with cooperating threads, the second fastener is rotated to advance into the internal lumen until the second engagement member is tightly coupled with the column. The first and second engagement members may be retained against respective ends of the column such that their central planes are approximately parallel with or approximately tangent to the exterior surface of the grip.

FIG. 4 illustrates an example head component 100 in association with a net handle. The actions described above in association with a method for producing a docking handle are only illustrative and other alternatives can also be provided where one or more actions are added, one or more actions are removed, or one or more actions are provided in a different sequence without departing from the scope of the claims herein.

FIGS. 5-9 illustrate an example base component 200 in accordance with the disclosure. Configured for providing an attachment station to a head component, the base component 200 includes a first surface 211, an opposite second surface 213, an engagement feature or retention member 230 provided to the first surface 211 and a cradle 212 projecting from the first surface 211.

Figure 11:
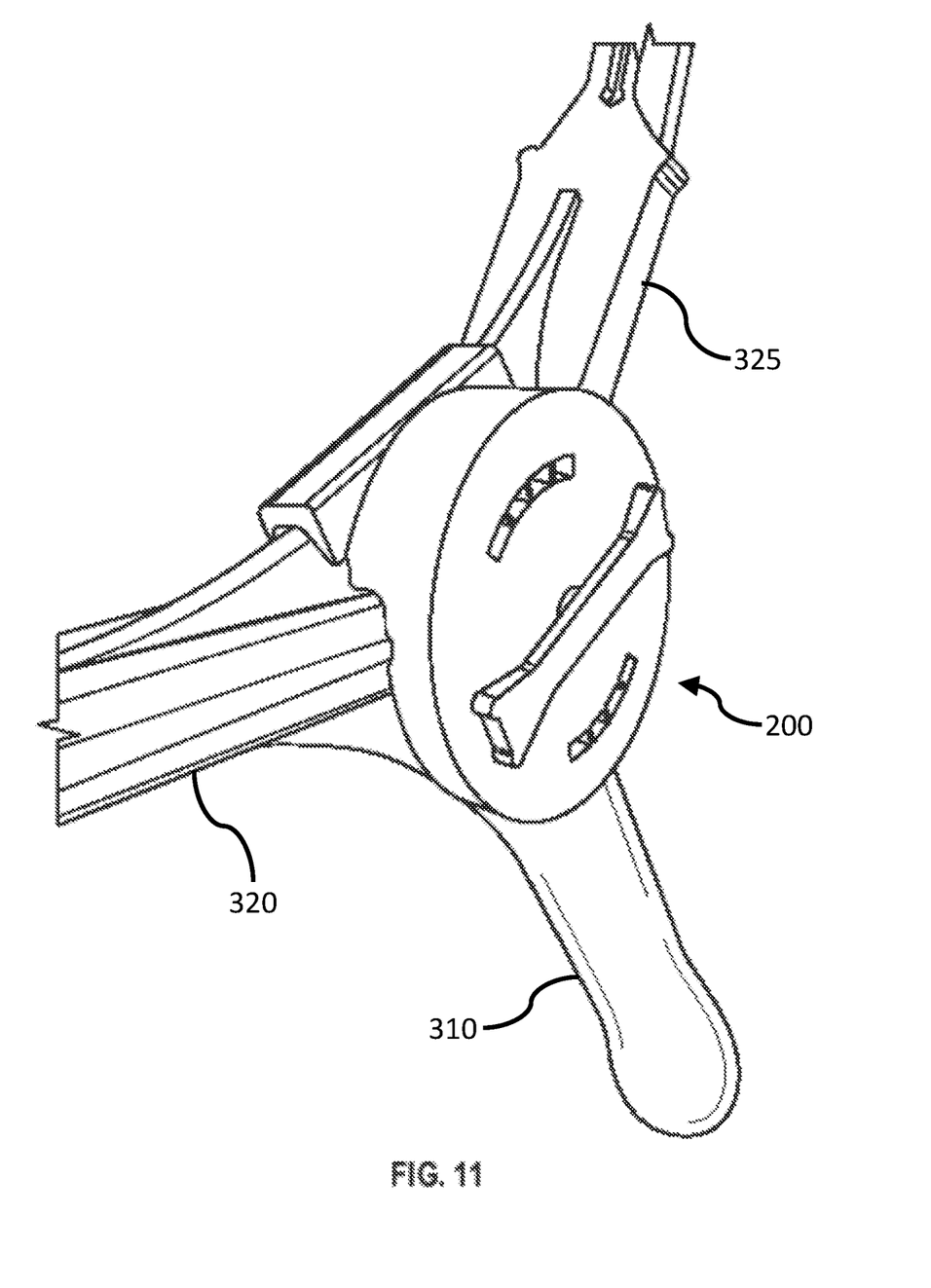
FIG. 11 illustrates perspective view of an example base component removably coupled with an example net.

The cradle 212 may open in a direction approximately parallel with the first surface 211 and be configured to grip or hook a net rim 320 near a handle 310 thereof (FIG. 11). In an example, the cradle 212 is configured to grip a net rim inner surface. The cradle 212 may also be configured to prevent relative translation between the base component 200 and a net with the head component when a force is applied to the net handle toward the cradle 212 and approximately parallel with the net handle. For example, translation may be prevented towards the cradle 212 and within 5 degrees of being parallel with the longitudinal axis of the handle.

Further, cradle 212 may facilitate disengagement from the net by rotation about an axis parallel to a normal axis to the first surface 211 and through one of the ends of the cradle 212. A contour 214 adjacent to the cradle 212 is configured with a shape matching a frontal ridge 325 of the net rim to thereby prevent relative translation between the base component 200 and the net in a direction approximately transverse to the handle and approximately parallel with a central plane of the net rim. For example, translation may be prevented in a direction having an angle of between about 85 and about 95 degrees with the longitudinal axis of the handle within 5 degrees of being parallel with the central plane of the net rim.

The first and second surfaces 211 and 213 of the base component 200 may take any of a variety of shapes suitable for supporting a fishing net including but not limited to circular or semi-circular. The base component 200 may take any of a variety of dimensions suitable for cooperating with a handle and/or rim of a net to which a head component has been provided. In an example, the first and second surfaces 211 and 213 are about 2.5 inches wide or across and the edge between the first and second surfaces 211 and 213 is about 0.25 inches. In an example, the cradle 212 projects about 0.75 inches from the first surface 211.

The retention member 230 may be coupled to the first surface 211 by a Chicago screw 231 through a central bore. In an example, the retention member 230 is formed from a material attracted by magnets. In a further example, the retention member 230 is a thin annulus such as a washer.

A clip or staple 250, having a bridge portion 251 between a pair of legs 253 and 255, is configured to mount to the base component second surface 213 at any of a variety of rotations and, in cooperation with the second surface 213, provide for attachment of the base component 200 to a personal article of a user such as a backpack, article of clothing, belt or strap. Each of the legs 253 and 255 may include resilient tabs 254 and 256, respectively.

The second surface 213 may further include receptacles 240 configured to cooperate with the resilient tabs 254 and 256 to selectively lock the staple 250 to the base component second surface 213. The receptacles 240 may further include a step or inner lip which is engaged by a step or lip of the resilient tabs 254 and 256 and may penetrate through the depth or thickness of the base component to provide openings 220 on the first surface 211. The bridge portion 251 of the staple 250 may be rigid to not flex in response to pulling or pushing forces.

The staple 250 may be configured for mounting to the base component second surface 213 at any of a variety of rotations selected by the user with consideration for the preferred mounting feature on the personal article and preferred decoupling direction of the head component 100 from the base component 200. For example, when the staple 250 is mounted to the base component second surface 213 at a zero-degree angle, as may be observed from FIG. 7, and a horizontal mounting feature of the article is threaded through the staple 250, a net may be decoupled from the base component 200 by a shearing force in a vertical direction. In another example, when the staple 250 is mounted to the base component second surface 213 at a 90-degree angle and a horizontal mounting feature of the article is threaded through the staple 250, a net may be decoupled from the base component 200 by a shearing force in a horizontal direction. In yet another example, when the staple 250 is mounted to the base component second surface 213 at a 75-degree or 105-degree angle and a horizontal mounting feature of the article is threaded through the staple 250, a net may be removed from the base component 200 by a shearing in an oblique direction.

A variety of methods for retaining a tool such as a net to a personal article may employ a base component. One example method includes providing a base component including a first surface, an opposite second surface, and a cradle projecting from the first surface and configured to grip a net rim near a net handle. A retention member is provided to the first surface of the base component.

A mounting feature or other portion of the personal article may be captured between the second surface and a staple having a bridge portion between a pair of legs. The staple may be locked to the second surface at a first chosen rotation by inserting resilient tabs at the end of the legs into receptacles provided to the second surface of the base component. In an example, the receptacles into which the resilient tabs are inserted are diametrically opposed.

The method may further include unlocking the staple from the second surface, capturing a loop or other mounting feature of a personal article and locking the staple to the second surface at a second chosen rotation different from the first rotation. In an example, the staple is unlocked by inserting a tool through into receptacles though first surface openings and disengaging the resilient tabs from the receptacle inner step or lip.

The retention member may be provided by coupling to the first surface with a Chicago screw provided through a central bore of the retention member.

Figure 10:
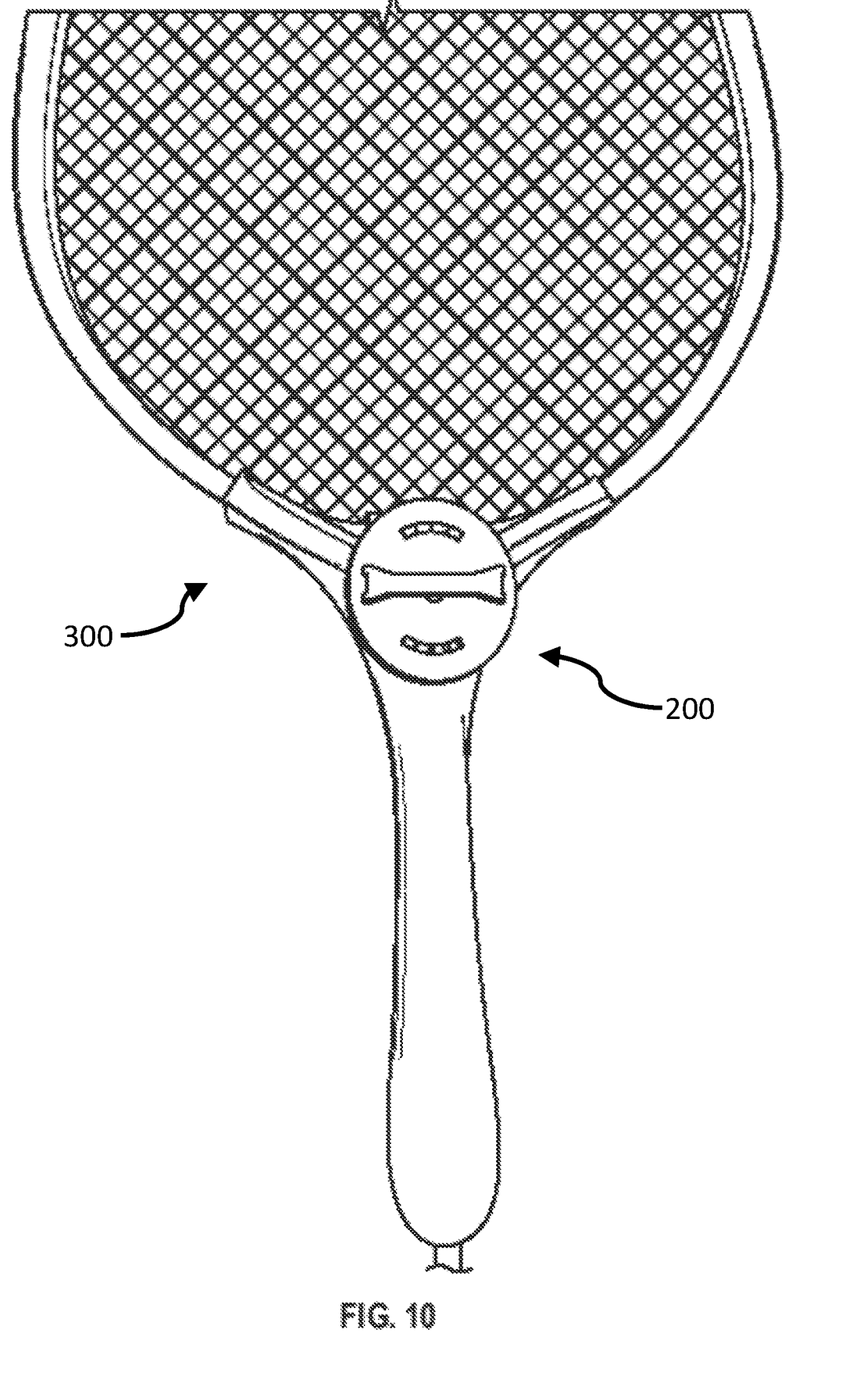
FIG. 10 illustrates rear view of an example base component removably coupled with an example net.

FIGS. 10 & 11 illustrate an example base component 200 removably coupled with an example net. The actions described above in association with a method for retaining a tool are only illustrative and other alternatives can also be provided where one or more actions are added, one or more actions are removed, or one or more actions are provided in a different sequence without departing from the scope of the claims herein.

In an example use scenario, with a net and/or net handle removably coupled with a base component removably attached to the personal article of an angler through the disclosed head component coupled with or incorporated into a portion of the net, the angler detaches or disengages the net by pulling the handle to translate mating surfaces between the base component and the head component such that the net is pulled away from the cradle and overcomes the respective attraction. Alternatively, the angler removes the net by rotating the net, for example, about an axis parallel with a central axis of the head component and/or base component to pivot the net on the cradle to misalign respective engagement members. The angler may then use the net to capture, restrain or otherwise contain one or more fish. When the net is no longer needed, the angler may resecure or reengage the net to the personal article through cooperation between the base component and the head component. For example, the angler may slide the net onto the base component and into gripping engagement with the inside of the net rim near the handle.

Embodiments of the disclosure are susceptible to being used for various purposes, including, though not limited to, enabling users to retain a tool such as a fishing net to a personal article. For example, a net with a net rim and a handle may be retained to a backpack loop.

In an example, disclosed head components 100 are provided as part of a system with disclosed base components 200. In a further example, multiple instances of disclosed head components 100 are provided with multiple instances of disclosed base components 200. In another example, disclosed head components 100 are provided separately, without disclosed base components 200. In an example, disclosed head components 100 are provided as part of a system with or within a net or net handle. In another example, disclosed head components 100 are provided separately, without a net or net handle. In another example, disclosed base component 200, head components 100 and nets may be provided all together. FIG. 12 illustrates an exploded view of an example net retaining system in association with a net.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. A net retention system, comprising:
 a base component including a first surface, a second surface opposite the first surface, a retention member provided to the first surface and a cradle projecting from the first surface and configured to grip a net rim near a net handle; and
 a head component including:
 configured for selective coupling with the retention member of the base component, a first engagement member facing a first direction;
 configured for selective coupling with the retention member of the base component, a second engagement member facing a second direction opposite the first direction; and
 separating the first and second engagement members, a column having first and second ends and being configured to extend through the net handle so as to resist rotation relative to the net handle.

2. The net retention system as set forth in claim 1, further comprising a staple configured for mounting to the base component second surface at any of a variety of rotations.

3. The net retention system as set forth in claim 2, wherein the staple further comprises a bridge portion between a pair of legs.

4. The net retention system as set forth in claim 3, wherein each leg of the pair of legs comprises a compressible tab.

5. The net retention system as set forth in claim 4, wherein the second surface further comprises receptacles configured to cooperate with the compressible tabs to selectively lock the staple to the base component second surface.

6. The net retention system as set forth in claim 1, wherein the cradle opens in a direction generally parallel with the first surface.

7. The net retention system as set forth in claim 1, wherein the first engagement member comprises a first magnet and the second engagement member comprises a second magnet.

8. The net retention system as set forth in claim 7, wherein the first and second engagement members are directed such that they experience mutual repulsive forces.

9. The net retention system as set forth in claim 1, wherein the cradle is configured to prevent relative translation between the base component and the net in at least one direction when the cradle grips the net rim near the net handle and the first engagement member or the second engagement is selectively coupled with the retention member of the base component.

10. The net retention system as set forth in claim 1, further comprising a first fastener coupling the first engagement member against the column through a through-hole of the first engagement member and a second fastener coupling the second engagement member against the column through a through-hole of the second engagement member.

11. The net retention system as set forth in claim 1, wherein central planes of the first and second engagement members are approximately parallel.

* * * * *